United States Patent
Agapi et al.

(10) Patent No.: US 7,797,676 B2
(45) Date of Patent: Sep. 14, 2010

(54) METHOD AND SYSTEM FOR SWITCHING BETWEEN PROTOTYPE AND REAL CODE PRODUCTION IN A GRAPHICAL CALL FLOW BUILDER

(75) Inventors: Ciprian Agapi, Lake Worth, FL (US); Felipe Gomez, Weston, FL (US); James R. Lewis, Delray Beach, FL (US); Vanessa V. Michelini, Boca Raton, FL (US); Sibyl C. Sullivan, Highland Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1300 days.

(21) Appl. No.: 10/827,852

(22) Filed: Apr. 20, 2004

(65) Prior Publication Data

US 2005/0235255 A1    Oct. 20, 2005

(51) Int. Cl.
G06F 9/44 (2006.01)
G06F 17/00 (2006.01)
G06F 7/00 (2006.01)
G06F 3/00 (2006.01)
G06F 3/048 (2006.01)

(52) U.S. Cl. .............. 717/109; 717/112; 717/121; 717/125; 715/762; 715/763; 702/661; 702/781

(58) Field of Classification Search ............... None
See application file for complete search history.

(56) References Cited

U.S. PATENT DOCUMENTS 6,430,615 B1 * 8/2002 Hellerstein et al. ......... 709/224
6,577,981 B1 * 6/2003 Grey et al. .................. 702/119

(Continued)

FOREIGN PATENT DOCUMENTS

KR     2002022360     3/2002

(Continued)

OTHER PUBLICATIONS

Kambo, N. S., et al., "Best Exponential Upper Bounds to Error Probability Obtainable by Random Coding for Binary Erasure Channels", Sankhya: Indian Journal of Statistics.

(Continued)

*Primary Examiner*—Tuan Q Dam
*Assistant Examiner*—Isaac T Tecklu
(74) *Attorney, Agent, or Firm*—Novak Druce + Quigg

(57) ABSTRACT

A method and system for automated code generation in a call flow builder (10) can include a display coupled to a processor. The processor can be programmed to select a real code (database connection) or a prototype code using a graphical interface (20) to provide a selected code and develop a call flow using the selected code. The processor can be programmed to select the prototype code as the selected code, test the call flow in a local development environment and further enable the switching of the selected code from the prototype to the real code to complete a database connection. The processor can be further programmed to enable specification of a default or range of values. Additionally, the processor can be programmed to use a database connection code that replaces a prototype assignment of values to variables when the real code is the selected code.

8 Claims, 2 Drawing Sheets

U.S. PATENT DOCUMENTS

| | | | |
|---|---|---|---|
| 7,047,249 B1* | 5/2006 | Vincent | 707/102 |
| 7,065,634 B2* | 6/2006 | Lewis et al. | 712/227 |
| 7,133,874 B2* | 11/2006 | Hill et al. | 707/102 |
| 7,197,739 B2* | 3/2007 | Preston et al. | 717/106 |
| 7,203,927 B2* | 4/2007 | Al-Azzawe et al. | 717/124 |
| 7,210,117 B2* | 4/2007 | Kudukoli et al. | 717/100 |
| 7,233,886 B2* | 6/2007 | Wegerich et al. | 703/2 |
| 7,278,130 B2* | 10/2007 | Iborra et al. | 717/101 |
| 7,389,492 B2* | 6/2008 | Chupa et al. | 717/106 |
| 2002/0133320 A1 | 9/2002 | Wegerich et al. | |
| 2004/0001092 A1* | 1/2004 | Rothwein et al. | 345/763 |
| 2004/0031017 A1* | 2/2004 | Vaidyanathan et al. | 717/110 |
| 2004/0216044 A1* | 10/2004 | Martin et al. | 715/526 |
| 2004/0221238 A1* | 11/2004 | Cifra et al. | 715/762 |
| 2004/0230600 A1* | 11/2004 | Devore et al. | 707/102 |
| 2005/0028133 A1* | 2/2005 | Ananth et al. | 717/105 |
| 2005/0125399 A1* | 6/2005 | Ireland et al. | 707/4 |
| 2005/0160395 A1* | 7/2005 | Hughes | 717/102 |
| 2006/0253789 A1* | 11/2006 | Cobb et al. | 715/762 |

FOREIGN PATENT DOCUMENTS

WO     WO 00/05643     2/2000

OTHER PUBLICATIONS

Vol. 34, Series A., Pt. 3, pp. 275-284, (1972).

* cited by examiner

METHOD AND SYSTEM FOR SWITCHING BETWEEN PROTOTYPE AND REAL CODE PRODUCTION IN A GRAPHICAL CALL FLOW BUILDER

BACKGROUND OF THE INVENTION

1. Technical Field

This invention relates to the field of audio interface development, and more particularly to a method and system for easily transitioning from prototype data to real data from a database.

2. Description of the Related Art

Very often, prototyping of audio interfaces involves presenting fake or dummy information to a user, with no real connection to a database. Later on, when the configuration and connection to a database is established, a programmer can replace the presentation of fake information with real information. Currently, there are no existing tools that make it easy to start with prototype database information and then transfer to real.

SUMMARY OF THE INVENTION

Embodiments in accordance with the invention can enable a method and system for enabling the selection of real (database connection) or fake (prototype) code within a graphical interface within an automated code generation mechanism. This flexibility in automatic code generation can provide a faster development cycle and a higher level of abstraction. Developers who do not have a database connection and Java-writing skills can develop and test complete call flows in a local development environment using the prototype code, then pass the call flow on to more skilled developers who can complete the database connection coding and, as database connections are defined, switch the code production from prototype to real.

In a first aspect of the invention, a method of automated code generation can include the steps of selecting among a real code and a prototype code using a graphical interface providing a selected code and developing a call flow using the selected code. The method can further include the step of selecting the prototype code as the selected code when testing the call flow in a local development environment and switching the selected code from the prototype code to the real code to complete a database connection. The method can further include the step of selecting the prototype code to conduct usability evaluations for refining a user interface which can be done without connecting to a database or remote server. When selecting the prototype code as the selected code, a default value or a range of values can be specified. Additionally, the method can include the step of selecting real code by using a database connection code that replaces a prototype assignment of values to variables.

In a second aspect of the invention, a system for automated code generation in a call flow builder can include a display and a processor coupled to the display. The processor can be programmed to select among a real code and a prototype code using a graphical interface to provide a selected code and develop a call flow using the selected code. The processor can be further programmed to select the prototype code as the selected code and testing the call flow in a local development environment and further enable the switching of the selected code from the prototype code to the real code to complete a database connection. The processor can be further programmed to enable the selection of the prototype code to conduct usability evaluations for refining a user interface which can be done without connecting to a database. The processor can be further programmed to enable the specification of a default value or a range of values when the prototype code is the selected code. Additionally, the processor can be programmed to use a database connection code that replaces a prototype assignment of values to variables when the real code is the selected code.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Embodiments in accordance with the invention can enable the selection of real code (database connection) or fake (prototype) code during the code generation step using a graphical interface within an automated code generation mechanism. This flexibility in automatic code generation can provide a faster development cycle and a higher level of abstraction. Developers who do not have database connection and Java-writing skills can develop and test complete call flows in a local development environment using the prototype code, then pass the call flow on to more skilled developers who can complete the database connection coding. As the database connections are defined, such developers can switch the code production from prototype to real. For example, developers whose interest is primarily in a user interface (UI) (e.g., human factors engineers) can conduct usability evaluations to tune the UI without any need to connect to remote servers, and can send the tuned call flow to programmers who can convert the call flow from a prototype to deployable code in a customer's environment. Programmers who do have database connection skills can also quickly create and test the call flow before making a further investment in more advanced programming.

Figure 1:
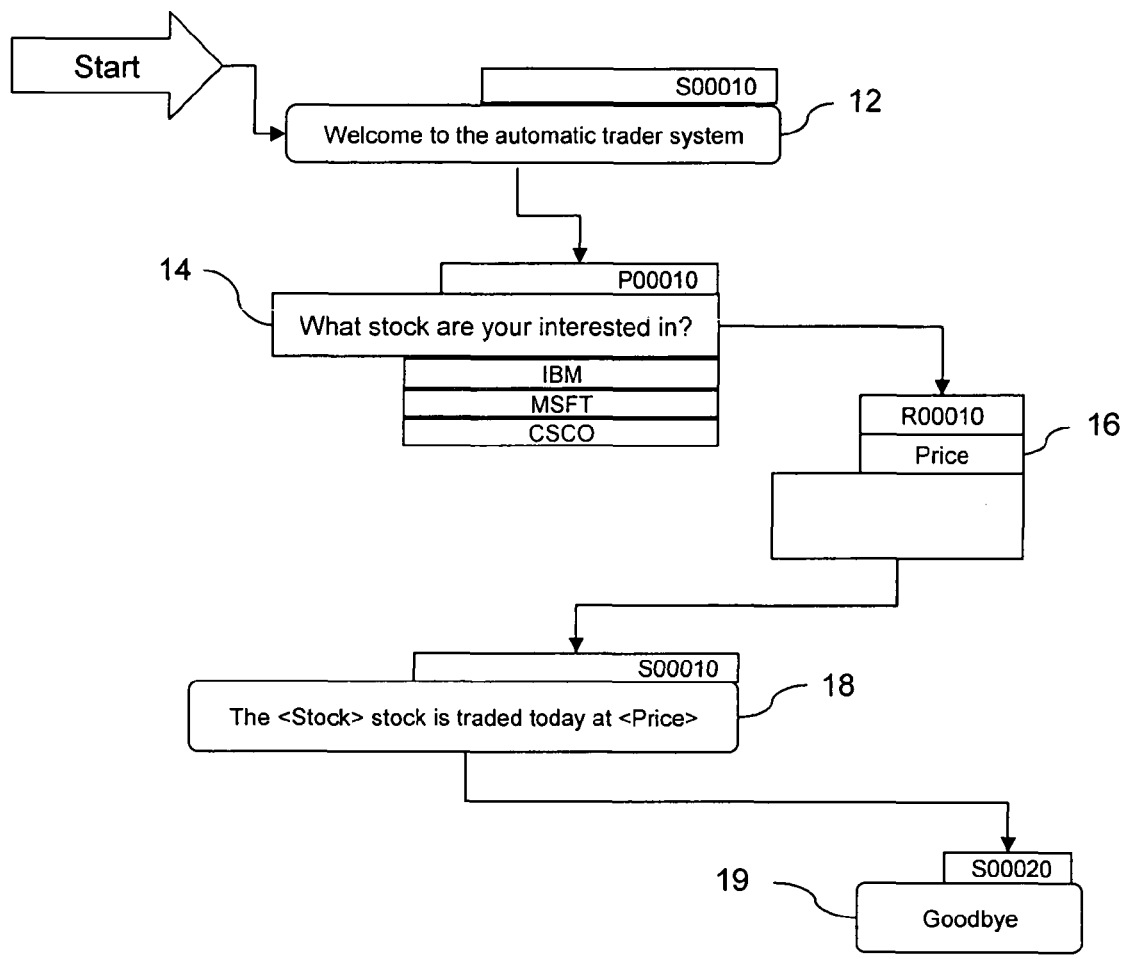
FIG. 1 is a call flow diagram useful in understanding a method of code generation in accordance with the present invention.

Referring to FIG. 1, a graphical call flow 10 for a stock trading call flow is shown which can include the flow steps of a welcome at step 12, a stock selection at step 14, a price code generation or processing at step 16, a presentation of desired information at step 18 and a farewell greeting at step 19. The processing or code generation (R00010) at step 16 can be configured to generate different code, depending on whether or not a connection to a database has been configured.

Figure 2:
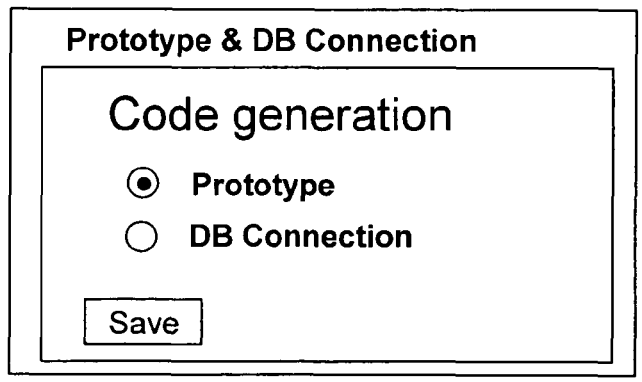
FIG. 2 is a graphical user interface for selection of code generation among prototype code and real code in accordance with the present invention.
Figure 3:
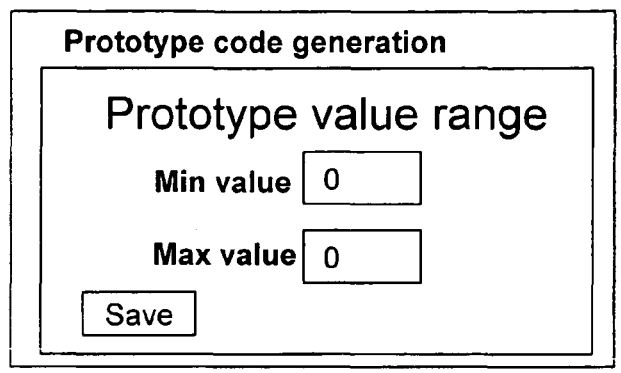
FIG. 3 is a graphical user interface for selection of a range of values for prototype codes in accordance with the present invention.
Figure 4:
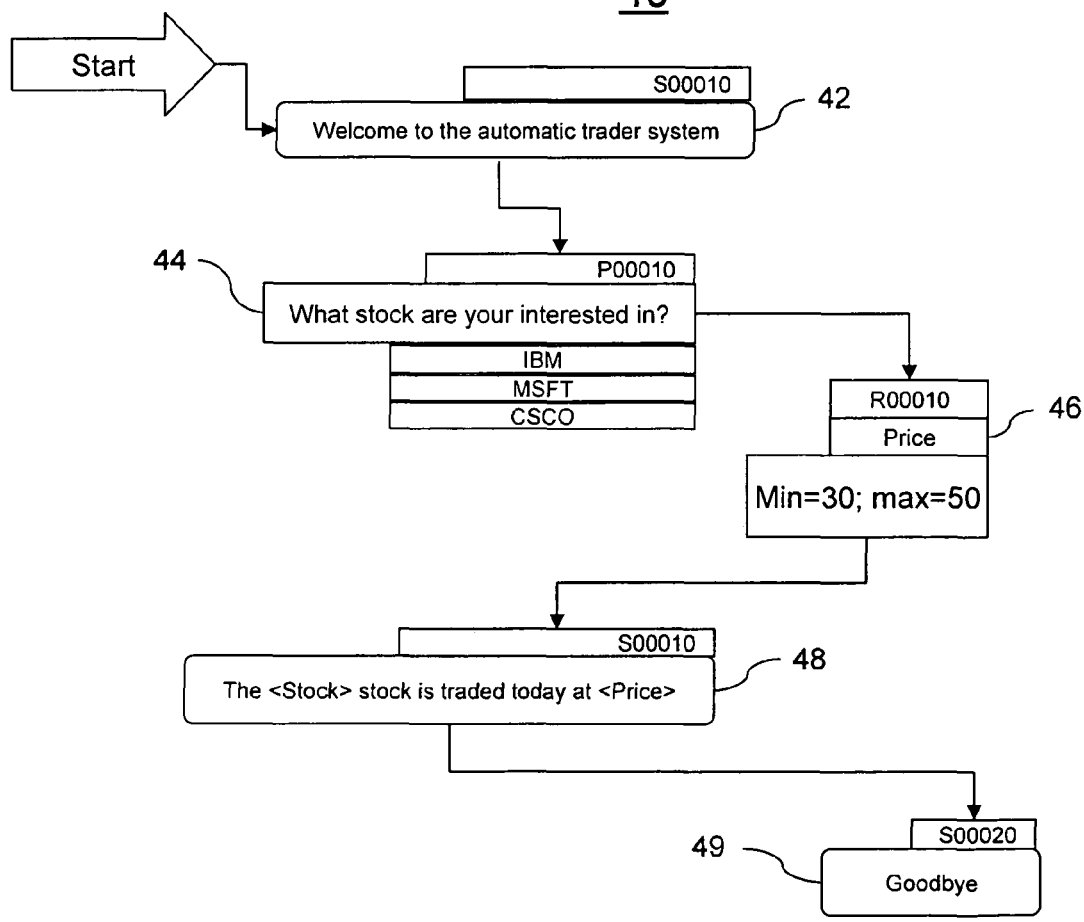
FIG. 4 is another call flow diagram useful in understanding a method of code generation in accordance with the present invention.

As shown in FIG. 2, the code generation can be determined through the use of a graphical user interface (GUI) 20, which can also be instantiated in many other ways, such as through a selection made from a contextual menu. If the prototype code generation is selected, then user can specify for each variable a default value as shown in FIG. 2 or a range of values as shown in the GUI 30 of FIG. 3. Using a similar UI (not shown), if the variable is categorical rather than numeric, the user could specify in the simplest case a single value for the variable (e.g., "IBM" as the value for a variable named Stock) or a set of potential values for the variable (e.g., "IBM", "AT&T", and "Lucent" as potential values for a variable named Stock). The call flow could display the value or range/set of values or information about the DB connection, depending upon which has been selected for code generation. Referring to FIG. 4, similar to the call flow 10 of FIG. 1, the call flow 40 can include a welcome at step 42, a stock selection at step 44, a price code generation or processing at step 46, a presentation of desired information at step 48 and a farewell greeting at step 49. In this instance, the call flow 40 displays the range/set of values (or alternatively information about a database connection) for the processing step 46, which again depends upon the selection for code generation.

In bold below, are the sections of this call flow that provide the prototype simulation for a numeric variable for which a range has been defined. Please note that the example below is merely sample code and that other ways to accomplish this function are contemplated within the scope of this invention (for example, in a VoiceXML 2.0 page). The <script> section illustrates the return of a random value with specific minimum and maximum boundaries. The random value is used within the <value> element. Similar code could be used to randomly select one from a set of categorical values for a string variable. Sections of the call flow script follows below:

```
<?xml version="1.0" encoding="iso-8859-1"?>
<!DOCTYPE vxml PUBLIC "vxml" " ">
<vxml version="1.0">
    <script>
        <! [CDATA[
        function getRandomValue(min,max){
            var temp = Math.random( );
            while (temp <= min){
                temp   =   temp   *    10;
                if    (temp   >    max){
                    temp = Math.random( );
                }
            }
            temp = Math.round(temp*100)/100;
            return temp;
        }
        ]]>
    </script>
    <form>
        <block>
            <prompt>Welcome to the automatic trader
            system</prompt>
        </block>
        <field name="Stock">
            <prompt>What stock are you interested in?</prompt>
            <grammar>I B M Microsoft Cisco</grammar>
        </field>
        <filled>
            <prompt>
                The <value expr="Stock" />is traded today at <value expr="getRandomValue(30,50)" />
                Goodbye.
            </prompt>
        </filled>
    </form>
</vxml>
```

Note that several ways are contemplated within the scope of this invention to provide a visual method for defining variables and their values to use for prototyping. The examples described above show a simple approach in which the processing block is used to define a single variable. Other UIs can allow the definition of multiple variables and their values. In the simplest version, each variable can be defined with a single default value (produced in VOICEXML® using either <var> or <assign> statements). In a more complex version, users can assign single values or ranges/sets of values, using code similar to the snippet above to randomly select from the range or set.

As an extension to the examples noted above, the UI could also provide a way for more advanced developers to develop a database connection code that can replace the prototype assignment of values to variables. The simplest embodiment can be to provide a blank space for typing the code. A somewhat more advanced method could launch an editor (similar to Eclipse code editors) for the database connection code. Another embodiment can launch a database connection wizard similar to those already present in various Eclipse perspectives.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of automated code generation in a graphical call flow builder, comprising the steps of:
   providing a graphical interface for selecting to generate a real code with a database connection or a prototype code without a database connection;
   selecting the prototype code as a selected code and developing a call flow using the selected code;
   testing the call flow in a local development environment; and
   switching the selected code from the prototype code to the real code by replacing prototype assignment of values with variables;
   wherein the prototype code is selected to conduct usability evaluations and the usability evaluations are done without connecting to a server containing a database.

2. The method of claim 1, wherein the method further comprises the step of specifying a default value when the prototype code is the selected code.

3. The method of claim 1, wherein the method further comprises the step of specifying a range of values when the prototype code is the selected code.

4. A system for automated code generation in a call flow builder, comprising:
- a display; and
- a processor coupled to the display, wherein the processor is programmed to:
  - provide a graphical interface for selecting to generate a real code with a database connection or a prototype code without a database connection;
  - select the prototype code as a selected code and developing a call flow using the selected code;
  - test the call flow in a local development environment; and
  - switch the selected code from the prototype code to the real code by replacing prototype assignment of values with variables;
  - wherein the prototype code is selected to conduct usability evaluations and the usability evaluations are done without connecting to a server containing a database.

5. The system of claim 4, wherein the processor is further programmed to enable the specification of a default value when the prototype code is the selected code.

6. The system of claim 4, wherein the processor further programmed to enable the specification of a range of values when the prototype code is the selected code.

7. A computer-readable storage medium, having stored thereon a computer program having a plurality of code sections executable by a computer for causing the computer to perform the steps of:
- providing a graphical interface for selecting to generate a real code with a database connection or a prototype code without a database connection;
- selecting the prototype code as a selected code and developing a call flow using the selected code;
- testing the call flow in a local development environment; and
- switching the selected code from the prototype code to the real code by replacing prototype assignment of values with variables;
- wherein the prototype code is selected to conduct usability evaluations and the usability evaluations are done without connecting to a server containing a database.

8. The computer-readable storage medium of claim 7, wherein the computer-readable storage medium is further programmed to enable the specification of at least one among a default value and a range of values when the prototype code is the selected code without connecting to a database.

* * * * *